United States Patent

Van Velzen et al.

[11] Patent Number: 5,674,464
[45] Date of Patent: Oct. 7, 1997

[54] DESULPHURIZATION OF WASTE GASES

[75] Inventors: Daniel Van Velzen, Brescia; Heinrich W. Langenkamp, Cadrezzate; Dimosthenis Papameletiou, Ispra, all of Italy

[73] Assignee: European Economic Community, Plateau du Kirchberg, Luxembourg

[21] Appl. No.: 362,497

[22] PCT Filed: Jul. 12, 1993

[86] PCT No.: PCT/EP93/01835

§ 371 Date: Jun. 9, 1995

§ 102(e) Date: Jun. 9, 1995

[87] PCT Pub. No.: WO94/01205

PCT Pub. Date: Jan. 20, 1994

[30] Foreign Application Priority Data

Jul. 13, 1992 [GB] United Kingdom ............... 9214851

[51] Int. Cl.$^6$ .................. C01B 17/20; C01B 7/01; C01B 17/69
[52] U.S. Cl. .................. 423/243.02; 423/241; 423/486; 423/507; 423/522
[58] Field of Search .................. 423/522, 502, 423/507, 243.02, 243.03, 241, 486

[56] References Cited

U.S. PATENT DOCUMENTS

| | | | |
|---|---|---|---|
| 2,163,877 | 6/1939 | Hooker | 423/502 |
| 3,346,340 | 10/1967 | Louvar | 423/502 |
| 3,353,916 | 11/1967 | Lester | 423/502 |
| 3,760,067 | 9/1973 | Ingwalson | 423/502 |
| 4,537,835 | 8/1985 | Rohrmann et al. | 423/503 |
| 4,668,490 | 5/1987 | van Velzen et al. | 423/243.04 |
| 5,266,295 | 11/1993 | Barda et al. | 423/502 |

FOREIGN PATENT DOCUMENTS

| | | |
|---|---|---|
| A1-0171570 | 2/1986 | European Pat. Off. . |
| 0179163 | 4/1986 | European Pat. Off. . |
| 1088441 | 10/1967 | United Kingdom . |
| 2045218 | 10/1980 | United Kingdom . |

Primary Examiner—Gary P. Straub
Attorney, Agent, or Firm—Bacon & Thomas

[57] ABSTRACT

The present invention relates to a process for the removal of sulphur dioxide from waste gases which process comprises contacting a waste gas containing sulphur dioxide with an aqueous solution containing sulphuric acid, hydrogen bromide and bromide to form sulphuric acid and hydrogen bromide; catalytically oxidizing in the vapor phase the hydrogen bromide formed to bromine and thereafter recycling the bromine to the first step of the process.

16 Claims, 4 Drawing Sheets

DESULPHURIZATION OF WASTE GASES

The present invention relates to a process for the removal of sulphur dioxide from waste gases which includes the catalytic oxidation of hydrogen bromide as an intermediate step and the formation of sulphuric acid as a useful end product.

The invention is based in the well-known reaction of bromine with sulphur dioxide to form sulphuric acid and hydrobromic acid:

$$Br_2 + SO_2 + 2H_2O \rightarrow 2HBr + H_2SO_4 \quad (1)$$

The desulphurisation is carried out by contacting the waste gases with an aqueous solution containing both acids and a small quantity of bromine. During the reaction, the two acids are produced simultaneously in the solution.

Subsequently, the acids are separated from the solution in such a way that hydrogen bromide is evaporated, brought in contact with an excess of oxygen (air) and catalytically oxidized to bromine according to the following reaction:

$$4HBr + O_2 \rightarrow 2Br_2 + 2H_2O \quad (2)$$

In this way, the consumed bromine is completely recycled and the overall reaction of the process is the formation of sulphuric acid from sulphur dioxide according to the following reaction:

$$2SO_2 + 2H_2O + O_2 \rightarrow 2H_2SO_4 \quad (3)$$

The single steps of the process are all well-known reactions, but have never before been combined in a single process.

Known wet regenerative flue gas desulphurisation processes include the process which is known as the Ispra Mark 13A process which is based on the above reaction (1).

In this process, the regeneration of the consumed bromine is carried out by electrolysis of the hydrogen bromide. Aspects of this process are discussed in EP-A-0016290 and EP-A-0171570. The process has been successfully developed to a large pilot plant scale and extensive market studies and comparative cost estimations have been carried out.

During these studies it appeared that the investment and operation costs of the electrolyzer would be very high. As an example, it was estimated that in case of a 500 MW power station operating with coal containing 2 wt % of sulphur, the electrolyzer represents about 25% of the total investment costs and about 30% of the viable operating costs.

Alternatives to the electrolysis step have been investigated, but, until now could not be realized. For example, catalytic oxidation of hydrogen bromide in the gas phase with oxygen present in the flue gas is not feasible due to the presence of sulphur dioxide. The eventually formed bromine will react directly with $SO_2$ to $SO_3$ and subsequently to $H_2SO_4$ in the vapour phase. This will give rise to the formation of an excessive amount of very fine acid droplets (areosol formation), which are extremely difficult to abate.

The arrangements of the present invention, however, allow for the separation of the hydrogen bromide to be oxidized in a sufficiently pure form to avoid the mist/aerosol formation. This result is obtained by a modification of the procedure of acid concentration of the original so called Ispra mark 13A process.

The vapour phase oxidation of hydrogen bromide (reaction (2)) is also a known process. There are a considerable number of disclosures for the catalyic gas phase oxidation of hydrogen bromide. Nearly all apply to the treatment of gas mixtures resulting from bromination reactions in organic chemicals manufacturing processes.

The surprising innovation of the present invention is that by making use of the particular properties of the vapour/liquid equilibrium of the reactor liquid, it has been possible to design a system to regenerate the consumed bromine by catalyic vapour phase oxidation, and to avoid the electrolysis step, which is cumbersome and expensive. This represents a considerable advantage with respect to the electrolytic decomposition of hydrogen bromide.

Accordingly, the present invention provides a process for the removal of sulphur dioxide from waste gas which process comprises contacting a waste gas with an aqueous solution containing sulphuric acid, hydrogen bromide and bromine to form sulphuric acid and hydrogen bromide; catalytically oxidizing in the vapour phase the hydrogen bromide formed to bromine and thereafter recycling the bromine to the first step of the process.

The $SO_2$-containing flue gases are treated with the washing solution in the main reactor, which can be any suitable gas-liquid contacting device. The washing liquid is a ternary aqueous solution, containing about 10 wt % $H_2SO_4$, about 20 wt % hydrogen bromide and a small amount of bromine (<0.5 wt %). Sulphur dioxide is absorbed in the solution and reacts immediately in the liquid phase according to reaction (1). The formed sulphuric and hydrobromic acids stay dissolved in the washing solution.

The major part of the washing solution is recirculated over the reactor to ensure a sufficient gas-liquid contact and a relatively small fraction is removed as a side stream. This stream has to be separated into its acid components to allow:

a) the removal of the produced sulphuric acid from the process, b) the re-oxidation into bromine of the hydrogen bromide, produced by reaction (1).

The separation of the solution into its main components is carried out by evaporation. The required evaporation energy is partly obtained by the use of the sensible heat of the incoming flue gas (150°–200° C.) and partly from a separate, external heat source. The required separation proves to be feasible by making use of the remarkable vapour-liquid properties of the ternary mixture.

During evaporation of the ternary solution, the first product to pass into the vapour phase is water, containing a small amount of hydrogen bromide (approximately 0.3 wt %). When removing the water component from the liquid, the acid concentrations of the liquid phase proportionally and gradually increase. The vapour phase continues to consist of practically pure water, as long as the acid concentrations in the liquid remain below 15 wt % $H_2SO_4$ and 30 wt % hydrogen bromide. This is the first phase of the separation process.

From this point on, there is a sharp increase in the hydrogen bromide content of the vapour phase, which finally reaches a composition very near to the hydrogen bromide/$H_2O$ azeotrope, 47.2 wt % hydrogen bromide. This generally occurs when the $H_2SO_4$ concentration in the liquid has reached approximately 30 wt %. During this second phase, hydrogen bromide and $H_2O$ are evaporated simultaneously, until the liquid phase consists only of sulphuric acid and water. This usually occurs at $H_2SO_4$ concentrations above 65 wt %.

The aforementioned properties are utilized to split the ternary liquid into three fractions in a continuous process. The first fraction consists of water with a small amount of hydrogen bromide, the second distillate is a rich hydrogen bromide/$H_2O$ mixture and the third fraction is the residue, moderately concentrated sulphuric acid (65–85 wt %). This result can be obtained by carrying out the continuous evaporation in two stages.

The first stage consists of the evaporation of about half of the present water. As a rough approximation, 100 parts of the incoming liquid contains 10 parts of $H_2SO_4$, 20 parts of hydrogen bromide and 70 part of $H_2O$. About 34 parts of $H_2O$ are evaporated, together with 2 parts of hydrogen bromide, which produces a liquid phase consisting of 15.8 wt % $H_2SO_4$ and 27.2 wt % hydrogen bromide. This first stage can make use of the sensible heat of a part of the incoming flue gases as an energy source for the evaporation. Control of the flow rate and temperature of the flue gas stream is necessary to limit the evaporation to the point where only a relatively small quantity of hydrogen bromide is present in the vapour phase.

The second stage consists of the evaporation of the remaining water and hydrogen bromide. This operation can conveniently be carried out in a forced circulation evaporation system, where concentrated (for instance 80 wt %) sulphuric acid is circulated. The energy needed for the evaporation is furnished by an external heat transfer medium and is directly transferred to the circulating liquid. A small stream of air, containing the required quantity of oxygen needed for the oxidation is added so that the resulting vapour phase can directly be passed to the catalytic converter, where reaction (2) takes place.

The catalytic oxidation of hydrogen bromide in the present invention takes place at temperatures of from 200° to 400° C. A large number of suitable catalysts are commercially available. Required residence times are in the order of 2 to 10 seconds, depending on the reaction temperature. Under these conditions, high conversions (>90%) of hydrogen bromide into bromide can be obtained.

The bromine containing vapour has to be contacted with the recycling reactor liquid to dissolve the condensable constituents (water and bromine). This yields a solution containing sufficient bromine to be used as the washing solution for the removal of sulphur dioxide from the waste gases in the reactor and completes the recycled operation.

Suitable catalyst compositions for use in the present invention include those containing copper or vanadium oxides and noble metals supported on alumina, silica, zirconia etc. of relatively low surface area. Previously reported reaction conditions for the catalytic oxidations of hydrogen bromide are between 200° and 400° C., and 5–10 seconds for the residence time. Experiments according to the present invention have shown that also at temperatures around 200°–250° C. and residence times between 1.7 and 2.5 seconds satisfactory bromine yields (more than 50%) can be obtained.

Preferred embodiments of the present invention will now be described in detail by way of example only, with reference to the accompanying drawings, of which.

Figure 1:
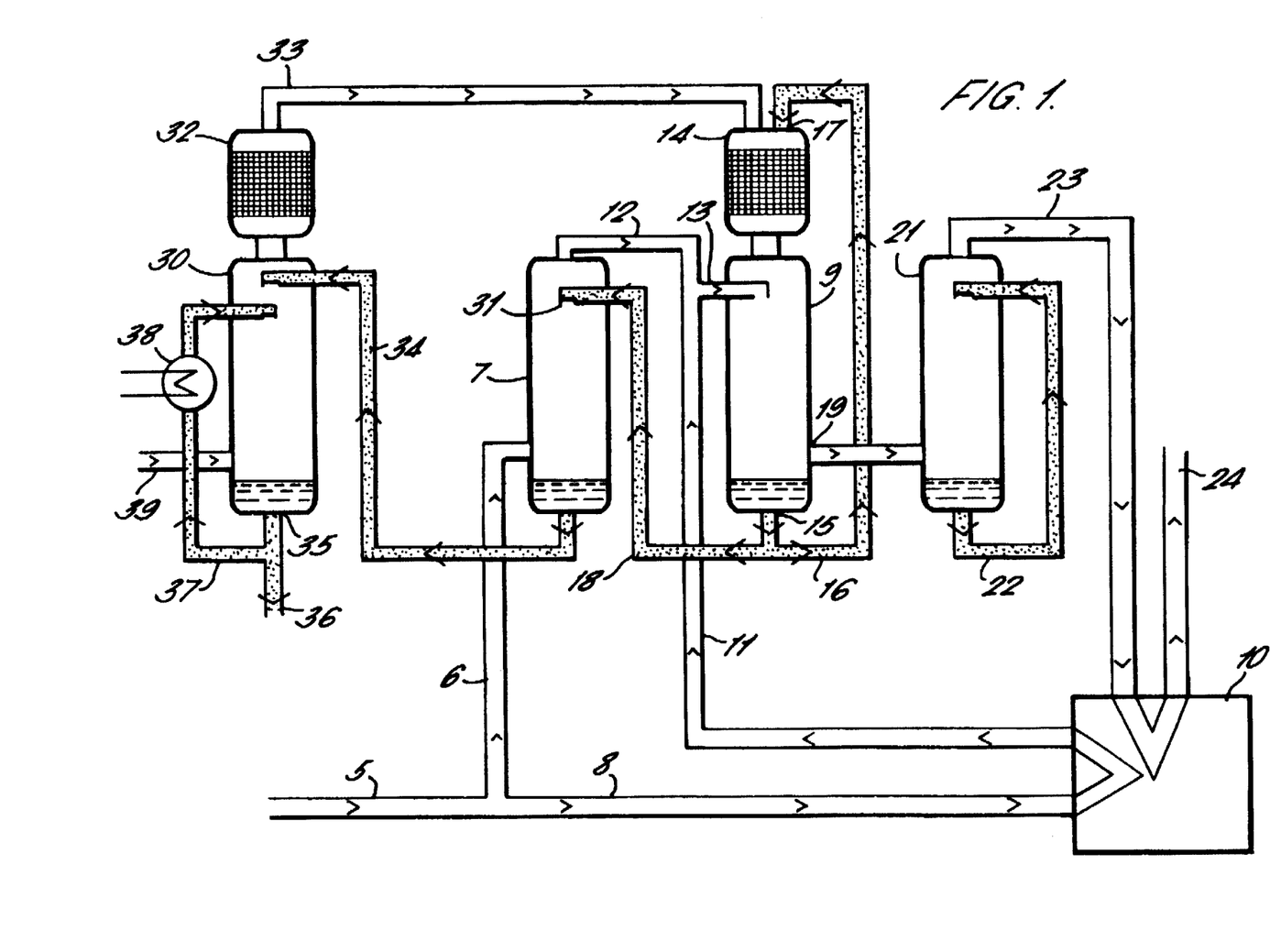
FIG. 1 is a schematic diagram of a typical pilot plant scale operation.

Referring to FIG. 1: Flue gas enters the system through channel 5. The direction of the flue gas through channel 5 is split into a main channel 8 and a minor channel 6. The main channel 8 leads the stream of flue gas to the reactor 9 via the regenerative heat exchanger 10 and channels 11 and 13. The minor channel 6 leads the stream of flue gas to the pre-concentrator 7.

It is important that the liquid phase which reacts with the $SO_2$ of the flue gas in the reactor 9 has absorbed all bromine vapours to avoid aerosol formation. This absorption takes place upstream of the reactor 9 in the bromine absorber 14. In the bromine absorber 14 the recycled stream of reaction liquid from reactor 9, is brought via channel 16, and entry point 17 in co-current contact with the vapour stream coming from the hydrogen bromide catalytic oxidation reactor 32, via channel 33.

The liquid phase leaves the bromine absorber 14 and passes into the reactor 9 where it is brought in co-current contact with the flue gas from channel 13.

Bromine is converted to hydrogen bromide and a bromine free flue gas stream leaves the reactor 9 at a bottom exit 19 via a demister for droplet separation.

The desulphurised flue gas which passes out via exit 19 still contains some traces of reactor liquid and hydrogen bromide vapour. Therefore a final scrubber 21 is placed downstream of the reactor 9 where the contaminents are washed out with water. The produced scrubber liquid may be returned to the reactor fluid.

The desulphurised flue gas in scrubber 21 is recycled via channel 22 before leaving scrubber 21 through channel 23. The desulphurised flue gas passes through channel 23 and a demister and is reheated in heat exchanger 10 before entering the stack at 24.

The sulphuric acid produced in the reactor solution has to be separated from the reactor liquid and concentrated. This acid is a valuable by-product of the process. Moreover, a stream of hydrogen bromide vapour has to be produced to allow the formation of the bromine needed for the desulphurisation. This operation is carried out in two stages, the first one in the pre-concentrator 7 and the second in the hydrogen bromide evaporator 30.

In the pre-concentrator 7 a large part of the water from the reactor liquid is evaporated together with a small fraction of the hydrogen bromide. This separation step is accompanied by evaporation making use of the sensible heat of the incoming flue gas.

To this end a side stream of recycled reaction liquid leaves the reactor 9 via exit 15, passes through channel 18 and is fed continuously to the pre-concentrator 7 where it is contacted countercurrently with a part of the hot flue gas entering the pre-concentrator 7 through channel 6. A liquid recycle improves the gas-liquid contact.

The side stream of the recycled reactor liquid enters the pre-concentrator 7 via a set of spray nozzles 31.

The hydrogen bromide evaporator 30 serves for the preparation of the gaseous feed for the hydrogen bromide catalytic oxidation reactor 32. The remaining water and hydrogen bromide are evaporated from the intermediate acid product which flows from the pre-concentrator 7 through channel 34 into the hydrogen bromide evaporator 30. Liquid phase $H_2SO_4$ leaves the hydrogen bromide evaporator at exit 35 where it may be drawn off as a product via channel 36 or recycled to the hydrogen bromide evaporator 30 through channel 37 via heater 38. Acid drawn of via channel 36 may be concentrated by current acid concentration processes, an example of which is described in FIG. 2. Air is introduced into hydrogen bromide evaporator 30 via channel 39.

An important feature of the set-up in FIG. 1 is that the required energy can be introduced into the liquid phase, avoiding excessive heat transfer problems. The heat load needed for the evaporation is considerable. This has to be furnished by combustion of fuel, methane or as elctrical energy.

It is important that the concentration is carried out in such a way that a rather concentrated sulphuric acid residue is obtained. The final acid concentration determines the temperature of the operation and, thus, the temperature of the produced vapour feed.

Figure 2:
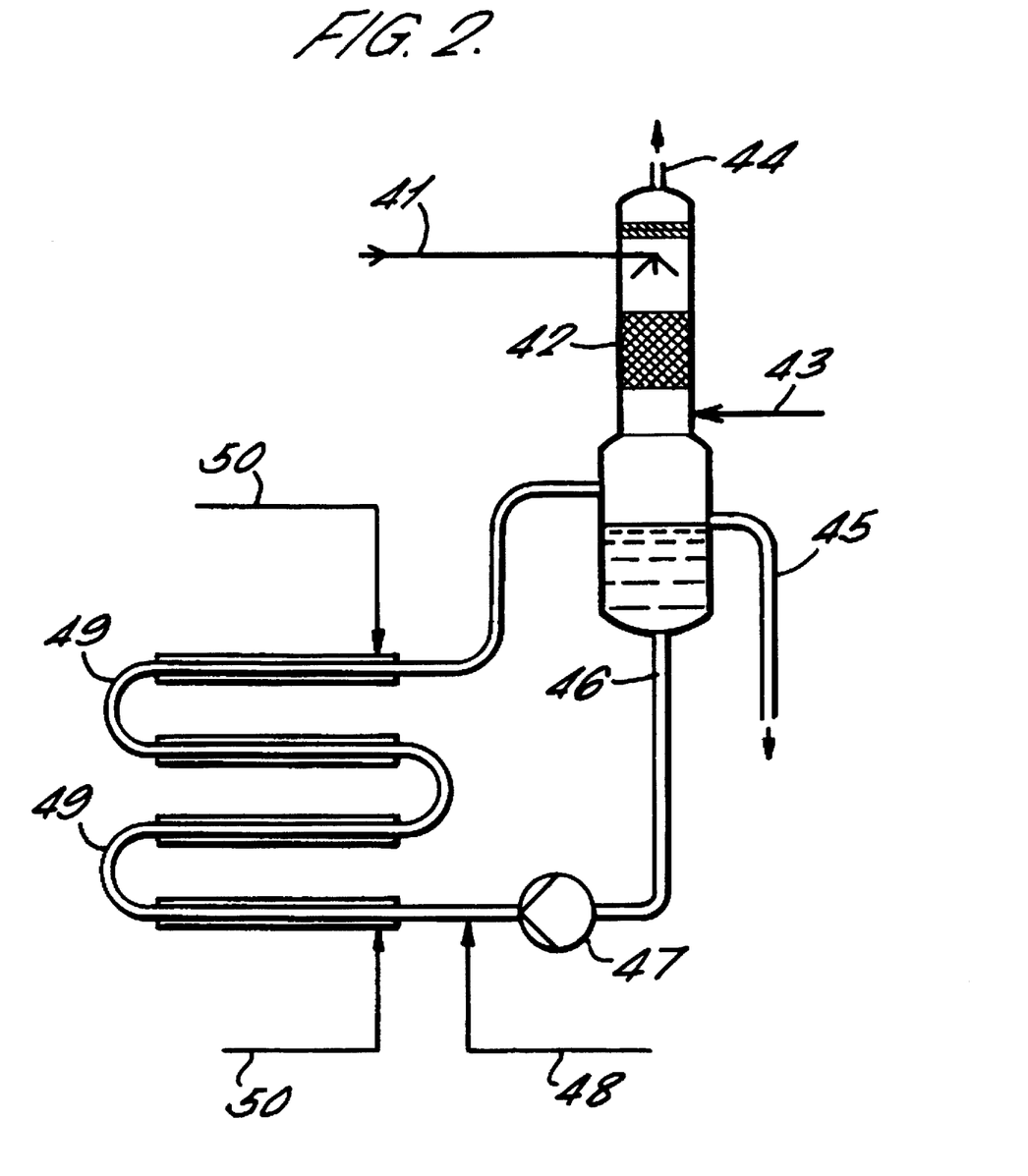
FIG. 2 is a schematic diagram of a forced circulation evaporation system.

Referring to FIG. 2: Refluxed feed acid is fed into the main body of the evaporating system 42 through channel 41. Air is introduced into system 42 through channel 43. Vapour produced escapes via exit 44. Concentrated product acid may be drawn off via channel 45 or may be recycled back to the system 42 through channel 46. Acid travelling along channel 46 is circulated by means of a circulation pump 47. Feed acid is introduced along channel 46 through channel 48. Acid in the recycling process is passed through looped passages 49 which are heated by connection to heat transfer media 50.

Figure 3:
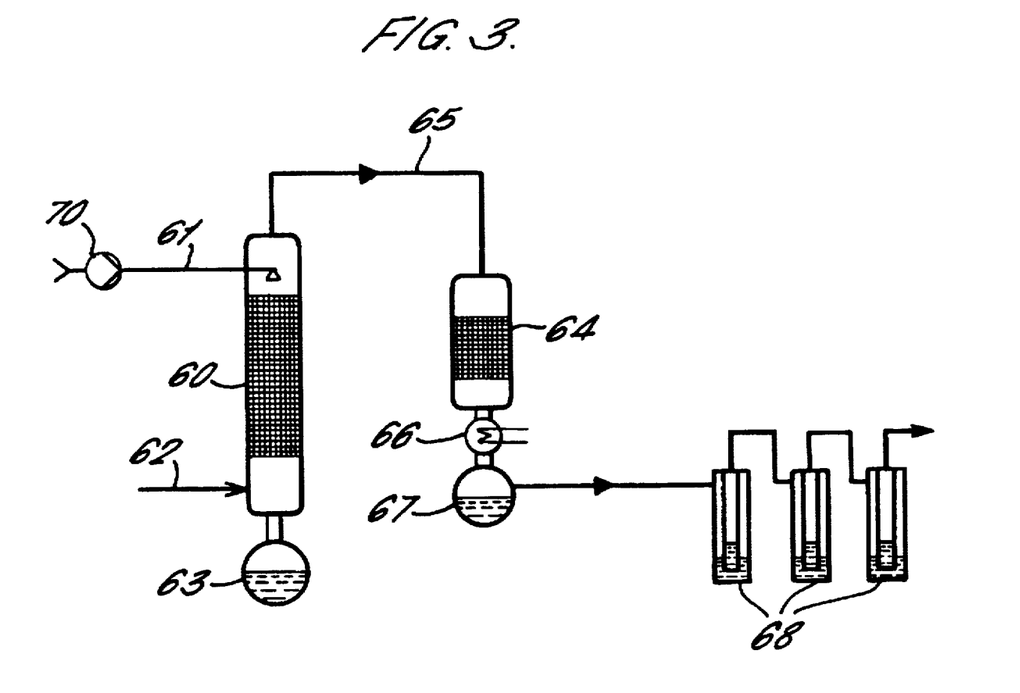
FIG. 3 is a schematic diagram of a laboratory scale test rig for testing the hydrogen bromide oxidation.

Referring now to FIG. 3: The equipment consists essentially of an evaporator 60, a catalytic converter 64 and an arrangement for the collection of the reaction products 68.

The evaporator 60 is externally electrically heated. A controlled stream of ternary reactor mixture is pumped by peristaltic pump 70 to the top of the evaporator 60 through channel 61. At the bottom of the evaporator 60 air flow is introduced through channel 62. Concentrated sulphuric acid collects at the bottom of the evaporator 60 and drains into collecting vessel 63.

The evaporation products from evaporator 60 pass into the catalytic reactor 64 through channel 65. Catalytic reactor 64 is filled with pellets of commercial catalyst. The channel 65 connecting evaporator 60 and the catalytic reactor 64 is electrically heated to warrant a constant entrance temperature to the catalytic heater 64. The catalytic reactor 64 can be externally heated to compensate for heat losses.

At the outlet of the reactor 64 there is a water cooled condenser 66 leading to a collecting vessel 67 in which water and unconverted hydrogen bromide is collected. The uncondensable gasses pass through a series of washing bottles 68 containing sodium sulphite and/or calcium bromide solutions to trap and analyse the formed bromine.

Figure 4:
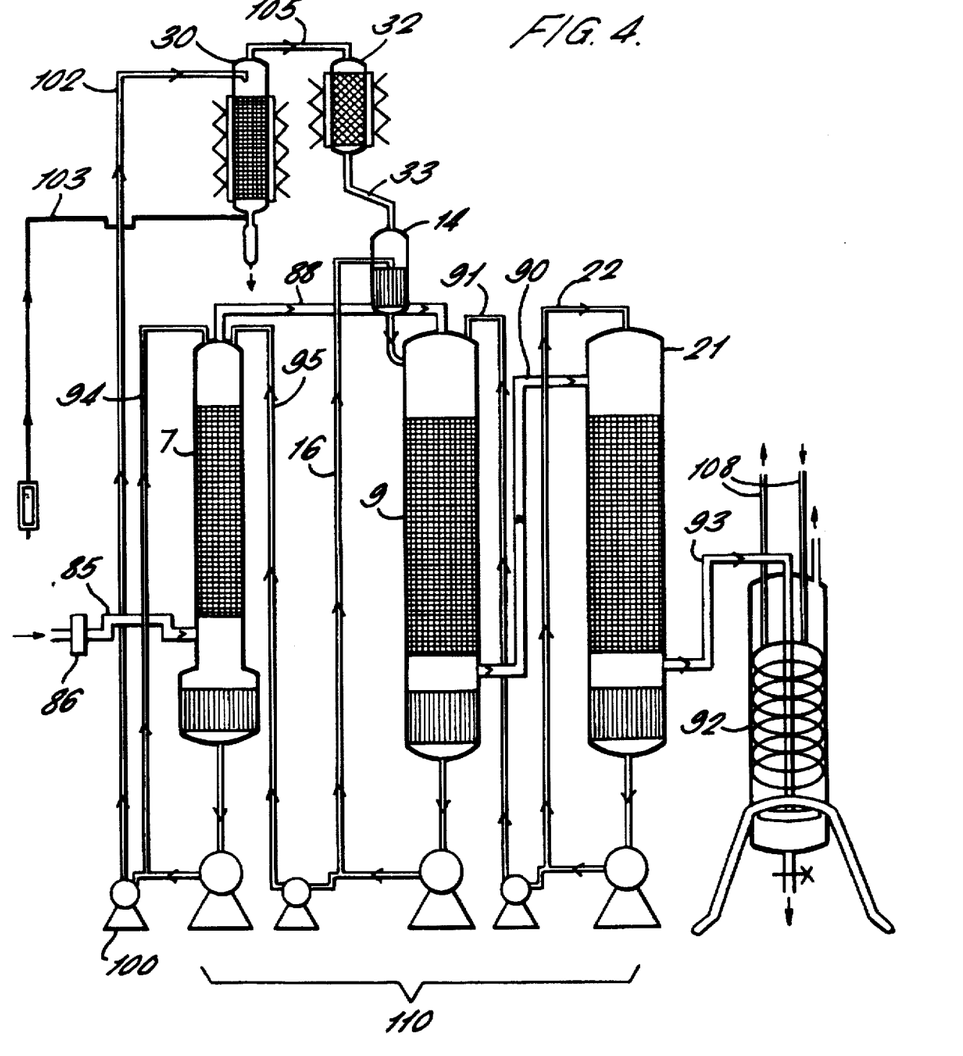
FIG. 4 is a finer schematic diagram of a laboratory scale test rig for testing the hydrogen bromide oxidation.

Referring to FIG. 4: this is very similar to the schematic FIG. 1. Flue gas enters the system through channel 85. A bag filter 86 is found along this channel. Channel 85 leads the flue gas stream to the pre-concentrator 7. The flue gas then passes to the main reactor 9 via channel 88. Here the gas is co-currently contacted with the liquid in and entering in reactor 9. The liquid of the reactor 9 recirculates over the reactor via a channel 16.

The desulphurized flue gas leaving the reactor 9 is passed through a scrubber 21 via a bottom exit of the reactor 19 and channel 90. The produced scrubber liquid recirculates over the scrubber 21 via channel 22. Scrubber liquid may be returned to the reactor fluid via channel 91.

Downstream of the scrubber 21 there is a cooler 92 which is reached via channel 93. The contents of the scrubber 21 are cooled by cooled water passing around the scrubber via channels 108.

The sulphuric acid produced in the reactor solution has to be separated from the reactor liquid and concentrated. This operation is carried out in two stages, first in the pre-concentrator 7 and then in the HBr evaporator 30. Liquid re-circulates over the pre-concentrator via channel 94. Reactor liquid is fed to the pre-concentrator 7 from the reactor 9 via channel 95. The second phase of the acid concentration takes place in the HBr evaporator 30. Pre-concentrator liquid is pumped to the HBr evaporator 30 from the pre-concentrator 7 via channel 102 and pump 100. Air is introduced to the HBr evaporator via channel 103.

Concentrated sulphuric acid leaves the HBr evaporator 30. Hydrogen bromide and water leave the HBr evaporator 30 in the vapour phase.

The leaving vapours pass into the hydrogen bromide catalytic oxidation reactor 32 via channel 105. After leaving the catalytic reactor 32 the gases are quenched by contacting with the recirculating reactor liquid in the bromine absorber 14 via channel 33. All condensables are dissolved in the reactor liquid and passed to the main reactor 9. The incondensables stay in the vapour phase and leave the system with the flue gas.

Flow through the system is aided by pumps 110.

Preferred embodiments of the present invention will now be described with reference to the following examples:

EXAMPLE 1

This example is based on the conditions encountered in the pilot plant of the so called Ispra Mark 13A process, situated at the SARAS Refinery in Sarroch, Sardinia (Italy). The example shows a typical pilot plant scale operation, where a stream of 20,000 $Nm^3/h$ of a waste gas with a $SO_2$ content of 4.57 $g/m^3$ (1600 ppm) is treated.

A large part of the process design is identical to the arrangements of the so called Ispra Mark 13A FGD process. Relevant differences are situated in the method of acid concentration, comprising the catalytic hydrogen bromide oxidation reactor. Other modifications concern the addition of a bromine adsorption section upstream of the main reactor and, obviously, the absence of the electrolysis section.

This example is described with reference to FIG. 1.

Flue gas entered the system at a temperature of 180° C. The incoming stream was split into two fractions:

One was directed to the pre-concentrator (7500 $Nm^3/h$). Here the sensible heat of the gas was utilized for the evaporation of the water from the reactor fluid in the acids separation section.

The main stream of the gas (12500 $Nm^3/h$) was passed to the reactor via the regenerative heat exchanger In the latter, the gas was cooled down from 180° to 90° C. and this energy was used for the re-heating of the treated flue gas from 50° to 106° C. Both flue gas streams were unified at the entrance of the reactor.

In the SARAS plant the reactor and the scrubber are both open spray columns of a diameter of 2 m and a column height of 13 m. The construction material is glass lined polyvinylester.

The reactor had an internal recycle of 120 $m^3/h$ of reactor liquid, consisting of an acid solution of approximately 10 wt % of $H_2SO_4$ and 20 wt % of hydrogen bromide. It is necessary that the concentration of hydrogen bromide in the reactor solution is in excess of the stochiometric proportion with $H_2SO_4$. Thus, at least 81 parts of hydrogen bromide to 49 parts of $H_2SO_4$ were required (minimum ratio 1.653). This was not a requisite for the so called original Ispra Mark 13A process. In the example, the hydrogen bromide concentration is 20 wt %; generally, this concentration can be between 15 to 30 wt %.

The absorption was carried out in a packed bed, where the recycle stream of reaction liquid was brought in co-current contact with the vapour stream coming from the hydrogen bromide oxidation section. This vapour stream consisted of a mixture of water, $N_2$, $O_2$, bromine and hydrogen bromide, entering at more than 300° C. and was cooled down before entering the main part of the reactor. The condensable components were $H_2O$, bromine and hydrogen bromide and these compounds dissolved in the reactor liquid. The uncondensables $O_2$ and $N_2$ stayed in the vapour phase, saturated with water vapur. The operation conditions of this section are given in table 1 below.

The liquid phase, leaving the bromine absorber, contained approximately 0.15 wt % bromine, sufficient for 95% desulphurisation of the flue gas stream. In the main part of the column, this liquid was brought in con-current contact with the flue gas. Sulphur dioxide was absorbed in the liquid and reacted with bromine to form $H_2SO_4$ and hydrogen bromide. All bromine was converted and a bromine free flue gas stream left the reactor at the bottom end via a demister for droplet separation. The operation conditions of the reactor are summarized in table 2 below.

The desulphurized flue gas still contained some traces of the reactor liquid and hydrogen bromide vapour. The containments were therefore washed out with water via a final scrubber. The produced scrubber liquid contained 0.3 ut % hydrogen bromide and 0.2 ut % $H_2SO_4$ and was afterwards returned to the reactor fluid. The operating temperature of the scrubber was 45°–500° C.

The desulphurised flue gas was passed through a demister for droplets separation and was reheated in a Lungstroem rotating heat exchanger from 50° C. to 106° C. before entering the stack. The operating conditions of the scrubber are summarized in table 3 below.

TABLE 1

| | Vapour phase | | | Liquid phase | |
|---|---|---|---|---|---|
| | "Bromine vapour" | | | Reactor liquid | |
| | In | Out | | In | Out |
| Flow rate (Nm³/h) | 780 | 145 | Flow rate (kg/h) | 144 000 | 144 680 |
| Temp. (°C.) | 330 | 69 | Temp. (°C.) | 64 | 69 |
| $Br_2$ (vol %) | 4.0 | 0.2 | $Br_2$ (wt %) | — | 0.15 |
| HBr (vol %) | 0.4 | — | HBr (wt %) | 20.0 | 19.9 |
| $H_2O$ (vol %) | 76.7 | 15.0 | $H_2SO_4$ (wt %) | 10.0 | 9.9 |
| $O_2$ (vol %) | 2.2 | 9.8 | | | |
| $N_2$ (vol %) | 16.7 | 74.9 | | | |

TABLE 2

| | Vapour phase | | | Liquid phase | |
|---|---|---|---|---|---|
| | Flue gas | | | Reactor liquid | |
| Flow rate (Nm³/h) | In | Out | | In | Out |
| | 20714 | 21384 | Flow rate (kg/h) | 144 680 | 144 000 |
| Temp. (°C.) | 87 | 65 | Temp. (°C.) | 69 | 64 |
| $SO_2$ (ppm) | 1600 | 80 | $Br_2$ (wt %) | 0.15 | — |
| HBr (ppm) | — | 25 | HBr (wt %) | 19.9 | 20.0 |
| $H_2O$ (vol %) | 12.4 | 15.3 | $H_2SO_4$ (wt %) | 9.9 | 10.0 |

TABLE 3

| | Vapour phase | | | Liquid phase | |
|---|---|---|---|---|---|
| | Flue gas | | | Reactor liquid | |
| Flow rate (Nm³/h) | In | Out | | In | Out |
| | 21384 | 20014 | Flow rate (kg/h) | 100 000 | 144 000 |
| Temp. (°C.) | 65 | 47 | Temp. (°C.) | 47 | 47 |
| $SO_2$ (ppm) | 80 | 80 | $Br_2$ (wt %) | — | — |
| HBr (ppm) | 25 | <2 | HBr (wt %) | 0.3 | 0.3 |
| $H_2O$ (vol %) | 15.3 | 9.5 | $H_2SO_4$ (wt %) | 0.2 | 0.2 |

In the pre-concentrator a large part of the water from the reactor liquid was evaporated, together with a small fraction of the hydrogen bromide. This separation step was accomplished by evaporation, making use of the sensible heat of the incoming flue gas (180° C.).

A side stream of the reactor liquid was fed continuously to the pre-concentrator, where it was contacted countercurrently with a part of the incoming hot flue gas. A liquid recycle improved the gas-liquid contact. A liquid phase, consisting of 15.8 wt % of $H_2SO_4$ and 27.2 wt % of hydrogen bromide was produced. This result was obtained by controlling the flow rates of the incoming liquid and gaseous streams.

In the SARAS plant, the pre-condenser is an open spray tower of 2.0 m internal diameter and a height of 8.5 m. The flue gas left the pre-concentrator with a temperature of 83° C., the liquid temperature in the pre-concentrator being 70°–75° C. Operation conditions of the pre-concentrator are found in table 4 below

TABLE 4

| | Vapour phase | | | Liquid phase | |
|---|---|---|---|---|---|
| | Flue gas | | | Pre-conc. acid | |
| | In | Out | | In | Out |
| Flow rate (Nm³/h) | 7500 | 8070 | Flow rate (kg/h) | 1330 | 844 |
| Temp. (°C.) | 180 | 83 | Temp. (°C.) | 64 | 73 |
| $SO_2$ (ppm) | 1600 | 1490 | $Br_2$ (wt %) | — | — |
| HBr (ppm) | — | 1240 | HBr (wt %) | 20.0 | 27.2 |
| $H_2O$ (vol %) | 10.0 | 16.2 | $H_2SO_4$ (wt %) | 10.0 | 15.8 |

The remaining water and hydrogen bromide were evaporated from the intermediate acid product in the hydrogen bromide evaporator and a liquid phase of 80 wt % $H_2SO_4$ was produced.

In the example, the final concentration of sulphuric acid was assumed to be 80 wt %, which led to a liquid temperature of 195° C. and a vapour temperature of 190° C. This was sufficient for the reaction to start without further pre-heating. Operation conditions for the evaporator are found in table 5 below.

TABLE 5

| | Vapour phase | | | Liquid phase | |
|---|---|---|---|---|---|
| | Air | | | From pre-conc. | |
| | In | Out | | In | Out |
| Flow rate (Nm³/h) | 160 | 780 | Flow rate (kg/h) | 844 | 167 |
| Temp. (°C.) | 25 | 190 | Temp. (°C.) | 73 | 195 |
| $Br_2$ (vol %) | — | — | $Br_2$ (wt %) | — | — |
| HBr (vol %) | — | 8.2 | HBr (wt %) | 27.2 | — |
| $H_2O$ (vol %) | p.m. | 71.3 | $H_2SO_4$ (wt %) | 15.8 | 79.6 |
| $O_2$ (vol %) | 20.0 | 4.1 | | | |
| $N_2$ (vol %) | 80.0 | 16.4 | | | |

A reactor was selected based on the catalyst $CuO/Cr_2O_3$ on alumina and allowed for a residence time of 10 s. This required a rector volume of about 4 m³ i.e a catalyst bed of 1.6 m diameter and 2 m height. These conditions warranted a hydrogen bromide conversion rate of 95% which caused a rise of temperature of 140° C. due to the exothermicy of the reaction. Operation conditions for the catalytic hydrogen bromide oxidation are give in table 6 below.

These conditions were based on laboratory experiments at the JRC Ispra of a $CuO/Cr_2O_3$ catalyst on alumina. Here at temperatures of 200°–250° C. and short residence times (<2.5) high conversions of hydrogen bromide were obtained.

TABLE 6

| | Vapour phase | |
|---|---|---|
| | In | Out |
| Flow rate (Nm³/h) | 780 | 765 |
| Temp. (°C.) | 190 | 330 |
| $Br_2$ (vol %) | — | 4.0 |
| HBr (vol %) | 8.2 | 0.4 |
| $H_2O$ (vol %) | 71.3 | 76.7 |
| $O_2$ (vol %) | 4.1 | 2.2 |
| $N_2$ (vol %) | 16.4 | 16.7 |

EXAMPLE 2

This describes a laboratory distillation of ternary reactor liquid.

The laboratory fractional distillation equipment consisted of a 1 liter round bottom flask, equiped with an external heating device and an internal thermometer for measurement of the temperature of the boiling liquid. On top of the flask there was a set-up with a thermometer for the vapour phase and a condensor to collect the distillate fractions.

In this equipment a batch fractional distillation of 560.8 g of the ternary reactor liquid was carried out. The original liquid contained 13.6 wt % hydrogen bromide and 8.4 wt % $H_2SO_4$. The distillate was collected in fractions of approximately 30–40 g. Each distillate fraction was analysed for its hydrogen bromide content. The composition of the residue in the flask after each fraction was calculated from a mass balance. The results of the experiment are given in Table 7 below.

TABLE 7

| | Temp. (°C.) | | Distillate | | Residue | | |
|---|---|---|---|---|---|---|---|
| Fraction | Top | Bottom | Weight (g) | wt % HBr | Weight (g) | wt % HBr | wt % $H_2SO_4$ |
| 1 | 100 | 105 | 28.9 | 0.00 | 560.9 | 14.3 | 8.8 |
| 2 | 100 | 106 | 27.7 | 0.04 | 533.2 | 15.0 | 9.3 |
| 3 | 100 | 107 | 31.7 | 0.05 | 501.5 | 16.0 | 9.9 |
| 4 | 100 | 107 | 29.6 | 0.09 | 471.9 | 17.0 | 10.5 |
| 5 | 101 | 108 | 31.2 | 0.17 | 440.7 | 18.2 | 11.2 |
| 6 | 102 | 109 | 28.7 | 0.23 | 412.0 | 19.4 | 12.0 |
| 7 | 104 | 111 | 29.3 | 0.34 | 382.7 | 20.9 | 12.9 |
| 8 | 109 | 114 | 31.2 | 0.67 | 351.5 | 22.7 | 14.1 |
| 9 | 112 | 118 | 28.9 | 1.35 | 322.6 | 24.6 | 15.3 |
| 10 | 115 | 124 | 31.9 | 2.86 | 290.7 | 27.0 | 17.0 |
| 11 | 116 | 135 | 33.0 | 11.3 | 257.7 | 29.0 | 19.2 |
| 12 | 124 | 135 | 37.7 | 31.6 | 220.0 | 28.5 | 22.5 |
| 13 | 126 | 165 | 41.2 | 43.9 | 178.8 | 25.0 | 21.7 |
| 14 | 128 | 188 | 40.4 | 46.2 | 138.4 | 18.8 | 35.8 |
| 15 | 130 | 214 | 43.6 | 44.5 | 94.8 | 7.0 | 52.2 |
| 15a | 130 | 232 | 4.6 | 40.0 | 90.2 | 5.3 | 54.9 |
| 16 | 130 | 235 | 25.3 | 18.9 | 64.9 | 0.0 | 76.3 |

When the distillation was completed, a residence of 64.9 g was obtained, consisting of 76.3 wt % sulphuric acid. The residue was completely free from hydrogen bromide. Moreover, it was clearly shown that the hydrogen bromide content in the distillate starts to rise sharply after fraction 10, where the liquid composition was 27.0 wt % hydrogen bromide and 17.0 wt % $H_2SO_4$.

EXAMPLE 3

This describes a laboratory experiment for testing the catalytic hydrogen bromide oxidation.

The experiment was carried out using the equipment as described in FIG. 3:

The evaporator was a vertical tubular pyrex furnace of 3.5 cm internal diameter and 60 cm length, filled with glass Moschig rings and externally electrically heated. A controlled stream of ternary reactor mixture was pumped to the top of the evaporator by a peristaltic pump. The liquid flow rate was 230 g/h. The composition of the mixture was 26.7 wt % hydrogen bromide and 14.3 wt % $H_2SO_4$. At the bottom of the evaporator an air flow of 40 l/h was introduced. Concentrated sulphuric acid collected at the bottom of the evaporator.

The evaporated products were passed into a catalytic reactor, which consisted of a tube of 3.5 cm diameter and 25 cm length, filled with pellets of a commercial $CuO/Cr_2O_3$ on alumina catalyst. The catalyst volume was 240 cm³. The tube, connecting the evaporator and the reactor was electrically heated to warrant a constant entrance temperature of the catalyst bed. In the present example, this temperature was maintained at 222° C.

The exothermicy of the oxidation reaction caused the temperature in the reactor to increase to 300° C. in the middle of the reactor and to 413° C. at the reactor exit.

At the outlet of the reactor there was a water-cooled condensor where water and unconverted hydrogen bromide is collected. The uncondensable gases were passed through a series of washing bottles containing sodium sulphite and/or calcium bromide solutions to trap and analyse the formed bromine.

The experiment lasted 180 minutes, during which 695 g of ternary liquid was introduced into the evaporator. At the bottom of the evaporator 120 g of 85 wt % $H_2SO_4$ were collected. The condensed liquid in flask (67) consisted of two layers, the lower layer being bromine (15 g) and the upper layer (448 g) consisted of 3.2 wt % hydrogen bromide and 4.4 wt % bromine (20 g of bromine).

The bulk of the formed bromine was collected as bromide in the washing bottles (123 g). It follows that the total amount of bromine formed was 158 g, whereas 16 g of unconverted hydrogen bromide was found in flask (3). This means that more than 90% of the hydrogen bromide was oxidized to bromine.

The excess air amounted to about 100% of the stochiometric and the calculated residence time of the vapour in the catalytic bed (at 300° C.) was 1.7 seconds.

EXAMPLE 4

This describes a further laboratory experiment for the testing of the catalytic hydrogen bromide oxidation.

In the same test rig as used for example 3, another experiment was carried out. The liquid pumping velocity was again 230 g/h and the air flow rate was maintained at 40 l/h.

The entrance temperature of the reactor was lowered to 165°–170° C., which caused a considerable loss in hydrogen bromide conversion and, thus, heat development. The time-average temperatures in the catalytic reactor were now 220° C. in the middle and 300° C. at the reactor exit.

The experiment lasted 250 minutes, during which 999 g of ternary liquid were introduced. At the bottom of the evaporator 205 g of 69 wt % $H_2SO_4$ were collected. The condensed liquid in the flask 67 consisted now only of one aqueous phase, containing 9.3 wt % of bromine and 18.8 wt % hydrogen bromide. The collected weight was 752 g, which means that in this phase 70 g of bromine and 144 g of uncoverted hydrogen bromide were present.

In the washing bottles another 28 g of bromine together with 9 g of hydrogen bromide were collected. It follows that 98 g of bromine were formed and 153 g hydrogen bromide left unconverted. The bromine conversion was thus approximately 40%. The gas residence time was somewhat higher than in the first experiment, due to the lower temperature. It was now calculated as 2.4 seconds.

EXAMPLE 5

This describes yet a further laboratory experiment for the testing of catalytic hydrogen bromide oxidation.

A third experiment was carried out in the same test rig as examples 3 and 4. The liquid pumping rate was decreased to 134 g/h. The air flow rate was maintained at 40 l/h.

The entrance temperature of the reactor was lowered to 140° C. The average temperatures in the catalytic reactor were now 223° C. in the middle and 205° C. at the reactor exit. The decrease of the exit temperature in comparison with the temperature at the middle of the reactor is caused by the relatively small rate of reaction (low pumping rate) in combination with inevitable heat losses.

The experiment lasted 220 minutes, during which 493 g of ternary liquid were introduced. At the bottom of the evaporator 84 g of 81 wt % $H_2SO_4$ were collected. The condensed liquid in flask (67) consisted of one homogeneous aqueous phase, containing 8.4 wt % of bromine and 13.9 wt % hydrogen bromide. The collected weight was 386 g, which means that in this phase 32 g of bromine and 51 g of unconverted hydrogen bromide were present.

In the washing bottles another 33 g of bromine were collected. No hydrogen was detected in the washing train. In total, 65 g of bromine were formed and 51 g hydrogen bromide left unconverted. The bromine conversion was thus approximatetly 56%.

The gas residence time was considerably higher than in the first experiments, due to the lower pumping rate. It was calculated as 3.5 seconds. It must be noted that the longer residence time caused a considerable increase in bromine yield, notwithstanding the fact that the average reactor temperature was lower than in example 4 (230° against 260° C.).

EXAMPLE 6

This example is of an experimental run of the process as carried out in a laboratory bench-scale plant. The plant is constructed entirely from technical glass elements. This example is described with reference to FIG. 4.

The plant is fed by flue gas. The flue gas is produced by the combustion of heavy fuel oil in a small burner system. A bag filter to remove particulates from the flue gas is placed between the burner and the laboratory bench-scale plant. The combustion produces flue gas with about 1000 mg/m$^3$ of sulphur dioxide. The $SO_2$ content can be increased by controlled additon of pure sulphur dioxide.

A strean of 8.5 m$^3$/h of flue gas with a $SO_2$ content of 4170 mg/m$^3$ enters the plant at a temperature of 180° C. It passes through the pre-concentrator where the temperature of the gas is decreased from 180° C. to 65° C. at the outlet. The flue gas passes through a channel from the pre-concentrator to the main reactor. This reactor consists of a glass column having an internal diameter of 20 cm and is packed to a height of 150 cm with 1 cm ceramic packings (Berl Saddles). Here the gas is co-currently contacted with a liquid consisting of 17.3 wt % HBr, 7.8 wt % $H_2SO_4$ and 250 mg/l (0.02 wt %) of $Br_2$. This liquid is recirculating over the reactor via a channel through an entry point and via the quencher back into the reactor at a flow rate of 300 l/h. The $SO_2$ of the flue gas reacts with the bromine of the liquid to form HBr and $H_2SO_4$. The reactor temperature is 53° C.

The desulphurized flue gas leaving the reactor at the bottom exit is then passed through a scrubber via a channel to remove traces of reactor liquid and HBr vapour by washing with water. The scrubber consists of a glass column of 15 cm internal diameter packed to a height of 85 cm with an open packing material. The produced scrubber liquid contains 0.07 wt % HBr and 0.05 wt % $H_2SO_4$ and recirculates over the scrubber via a channel at a rate of 100 l/h. Scrubber liquid is returned at regular intervals to the reactor fluid in the reactor via a channel to compensate evaporation losses. The operating temperature of the scrubber 21 is 37°.

Downstream of the scrubber there is a cooler reached via a channel, where a large part of the water vapour leaving the system is condensed. This cooler serves also for checking possible losses of HBr and sulphur compounds with the flue gas. To this end the condensate realized from the cooler is measured and analysed: 150 g/h of consensate was collected, containing 0.17 wt % HBr and 0.07 wt % $H_2SO_4$.

The sulphur dioxide content of the incoming as well as the leaving flue gas is monitored. This is done by an infrared gas analyser (Uras 3G-Hartmann & Braun). The average value over more than 12 hours of the $SO_2$ concentration in the incoming as is 4170 mg/m$^3$. The average concentration of the purified flue gas is 630 mg/m$^3$. The desulphurization yield is thus 85%.

The sulphuric acid produced in the reactor solution has to be separated from the reactor liquid and concentrated. This operation is carried out in two stages, first in the pre-concentrator and then in the HBr evaporator. Th preconcentrator consists of a glass column of 15 cm internal diameter, packed to a height of 90 cm with 1 cm glass Rasching rings. Liquid recirculates over the pre-concentrator via a channel and consists of 28.4 wt % HBr and 13.3 wt % $H_2SO_4$. The concentration of this liquid is maintained constant by control of the operating temperature, in this case at 64° C. The liquid recirculation rate is approximately 60 l/h.

A constant flow of 682 ml/h(=820 g/h) of reactor liquid is fed from the reactor to the pre-concentrator via a channel. From this stream, water and a small quantity of HBr are evaporated until its composition is identical to the preconcentrator liquid. The sensible heat of the incoming flue gas (180° C.) is the main energy source for the evaporation operation.

The second phase of the acid concentration takes place in the HBr evaporator. This piece of equipment consists of a vertical pyrex glass tube of 3.5 cm internal diameter and 60 cm length, filled with glass Rasching rings. The tube is contained and heated by an electrical furnace. A controlled stream of pre-concentrator liquid is pumped via a pump and a channel to the top of the evaporator. The liquid flow rate is 269 ml/h(=350 g/h). At the bottom of the evaporator an air flow of 60 l/h is introduced. The temperature of the HBr evaporator is maintained at approximately 220° C.

Concentrated sulphuric acid is collected at the bottom of the evaporator at a flow rate of 48 g/h. The acid is of high concentration, 98.0 wt %, clear and slightly yellow-coloured. Hydrogen bromide and water leave the evaporator in the vapour phase via a channel.

The leaving vapours pass into the gas phase catalytic reactor (hydrogen bromide catalytic oxidation reactor). This apparatus consists of a pyrex tube of 3.5 cm diameter and 50 cm length, filled with pellets of a commercial catalyst, CuO/$Cr_2O_3$ on an alumina support. The catalyst volume is 480 cm³. The gas entrance temperature is maintained at 210° C. The catalytic reactor is externally heated to compensate for heat losses. However, the exothermicity of the oxidation reaction causes the temperature in the catalytic reactor to rise to a maximum of 430° C., approximately in the centre of the catalytic reactor.

From a mass balance calculation over the HBr evaporator, it follows that the streams fed to the catalytic reactor are the following:

| HBr | 99 g/h | 1.22 mol/h |
|---|---|---|
| H₂O | 203 g/h | 11.28 mol/h |
| Air | 60 l/h)N₂ | 1.99 mol/h |
| | )O₂ | 0.52 mol/h |
| | Total | 15.01 mol/h |

The gas mixture thus consists of about 75 vol % of water. Oxygen is present in about 70% stochiometric excess with respect to HBr. The residence time of the gas in the catalyst bed, calculated at 400° C. is approximately 2 seconds.

After leaving the catalytic reactor the gases are quenched by passing via a channel into the quencher (bromine absorber) and contacting with the recirculating reactor liquid (300 l/h). The quencher consists of a 12 cm internal diameter glass column, filled to a height of 30 cm with 1 cm glass Rasching rings. In this apparatus gas and liquid are flowing co-currently. All condensables (bromine, water and unreacted hydrogen bromide) are dissolved in the reactor liquid and are subsequently passed to the reactor which is situated directly downstream of the quencher. The uncondensables (unreacted $O_2$ and $N_2$) stay in the vapour phase and leave the system with the flue gas.

Bromine, produced by the oxidation of HBr, is completely dissolved in the reactor liquid. The bromine production rate can thus be calculated by sampling and analysing the inlet reactor liquid stream.

The average $Br_2$ concentration of this stream is 250 mg/l and its flow rate is 300 l/h. The bromine production is thus 75 g/h=0.47 mol/h. This corresponds well to the $SO_2$ conversion rate, calculated by 8.5×(4.17−0.63)=30 g/h=0.49 mol/h. The bromine conversion in the catalytic reactor 32 can be found by: 2×0.47/1.22=77%.

EXAMPLE 7

This example gives the results of another experimental run carried out in the same laboratory bench-scale plant as described for example 6, but under different operation conditions. The main difference is situated in the lower temperature of the HBr catalytic oxidation reactor, which causes a considerably lower conversion of HBr to $Br_2$ (42% against 77%) than in example 6. This obviously leads to a lower desulphurization rate and various differences in liquid and vapour compositions. All liquid flow rates and most of the vapour flow rate are identical to example 6.

As in example 6 the incoming flue gas flow rate is 8.5 m³/h and its temperature 180° C. The $SO_2$ content of the incoming gas is now 3000 mg/m³, whereas the purified gas contains 950 mg/m³. Both values are average figures over the total duration of the experiment, 13½ hours. The average desulphurization yield is thus 68%.

The recirculating liquid flow rate in the main reactor is maintained at 300 l/h and also the reactor temperature is unvaried, 53° C. As a consequence of the lower HBr conversion, the sulphuric acid concentration is notably lower than in example 6. The composition of the circulating fluid is now 15.6 wt % HBr and 4.7 wt % $H_2SO_4$. The average $Br_2$ content of the liquid entering the reactor at the top is 137 mg/l.

The scrubber operating temperature is 37° C. and the scrubber liquid recirculating rate is 100 l/h, as in example 6. The scrubber liquid again contained very low HBr and $H_2SO_4$ concentrations, 0.04 wt % HBr and 0.02 wt % $H_2SO_4$. In the downstream condensor 210 g/h of condensate was collected, containing 0.04 wt % HBr and 0.07 wt % $H_2SO_4$.

The liquid circulating in the pre-concentrator consists of 28.3 wt % HBr and 14.0 wt % $H_2SO_4$, practically identical to the composition of this liquid during example 6. Also now, the temperature is maintained, at 64° C. and the liquid recirculation rate is approximately 60 l/h. Also the flow of reactor liquid fed to the pre-concentrator is maintained constant, 682 ml/h.

The conditions in the HBr evaporator are unvaried: the liquid flow rate from the pre-concentrator 7 is again 269 ml/h, the air flow is 60 l/h and the temperature of the HBr evaporator is maintained at approximately 220° C. Concentrated sulphuric acid is collected at the bottom of the evaporator at a flow rate of 51 g/h. The acid concentration is now 96.8 wt %. The acid quality seems to be very good, limpid and only slightly yellow.

The volume and composition in the catalyst used for the HBr oxidation is the same as in example 6, 480 cm³ of a commercial $CuO/Cr_2O_3$ catalyst. The gas entrance temperature is lowered from 210° C. in example 6 to 175° C. in the present example. The maximum temperature in the reactor is now 350° C. instead of 430° C. in the preceding example. The vapour phase composition and the residence time are practically the same as before.

The most significant difference between example 6 and the present run is in the HBr conversion in the catalytic reactor, caused by the lower reaction temperature. The produced reactor liquid now contains 137 mg/l of bromine, which corresponds to $Br_2$ production rate of 41 g/h=0.26 mol/h. The bromine conversion in the catalytic reactor is then found by: 2×0.26/1.22=42%, against 77% in the previous example.

The observed $Br_2$ production rate corresponds again satisfactorily well to the observed $SO_2$ conversion rate, calculated by a decrease of $SO_2$ from 3000 to 950 mg/m³ in a flue gas stream of 8.5 m³/h. This gives a $SO_2$ conversion rate of 17.4 g/h=0.27 mol/h.

We claim:

1. A process for the removal of sulphur dioxide from waste gases which process comprises contacting a waste gas containing sulphur dioxide with an aqueous solution containing sulfuric acid, hydrogen bromide and bromine to form sulfuric acid and hydrogen bromide in the aqueous solution; wherein a portion of the solution containing the hydrogen bromide formed by said contact is subjected to a two-stage evaporating process to produce a concentrated hydrogen bromide containing vapor by evaporating a large portion of water from the solution in the first stage, continuing the evaporation in the second stage to produce said concentrated hydrogen bromide containing vapor; and catalytically oxidizing the hydrogen bromide in the concentrated hydrogen bromide containing vapor to produce bromine and thereafter recycling the bromine to the aqueous solution used to contact the sulfur dioxide waste gas.

2. A process as claimed in claim 1 wherein the weight ratio of hydrogen bromide to sulfuric acid in the aqueous solution used in the contacting is in excess of 1.653.

3. A process as claimed in claim 1 wherein the catalyst is selected from the group consisting of copper oxide, vanadium oxide, and noble metals supported on any one of alumina, silica or zirconia.

4. A process as claimed in claim 1 wherein the weight ratio of hydrogen bromide to sulphuric acid in the aqueous solution used in said contacting is in excess of 1.653, and wherein the catalyst is selected from the group consisting of copper oxide, vanadium oxide, and noble metals supported on any one of alumina, silica or zirconia.

5. A process as claimed in claim 1 wherein the catalytic oxidation of hydrogen bromide takes place at a temperature of from 200° C. to 400° C.

6. A process as claimed in claim 1 wherein the weight ratio of hydrogen bromide to sulphuric acid in the aqueous solution used in said contacting is in excess of 1.653, and wherein the catalytic oxidation of hydrogen bromide takes place at a temperature of from 200° C. to 400° C.

7. A process as claimed in claim 1 wherein the catalyst is selected from the group consisting of copper oxide, vanadium oxide and noble metals supported on any one of alumina, silica or zirconia, and wherein the catalytic oxidation of hydrogen bromide takes place at a temperature of from 200° C. to 400° C.

8. A process as claimed in claim 1 wherein the weight ratio of hydrogen bromide to sulphuric acid in the aqueous solution used in said contacting is in excess of 1.653, and wherein the catalyst is selected from the group consisting of copper oxide, vanadium oxide, and noble metals supported on any one of alumina, silica or zirconia, and wherein the catalytic oxidation of hydrogen bromide takes place at a temperature of from 200° C. to 400° C.

9. A process as claimed in claim 1 wherein the residence time for the catalytic oxidation of hydrogen bromide is on the order of from 2 to 10 seconds.

10. A process as claimed in claim 1 wherein the weight ratio of hydrogen bromide to sulphuric acid in the aqueous solution used in said contacting is in excess of 1.653, and wherein the residence time for the catalytic oxidation of hydrogen bromide is on the order of from 2 to 10 seconds.

11. A process as claimed in claim 1 wherein the catalyst is selected from the group consisting of copper oxide, vanadium oxide, and noble metals supported on any one of alumina, silica or zirconia, and wherein the residence time for the catalytic oxidation of hydrogen bromide is on the order of from 2 to 10 seconds.

12. A process as claimed in claim 1 wherein the weight ratio of hydrogen bromide to sulphuric acid in the aqueous solution used in said contacting is in excess of 1.653, and wherein the catalyst is selected from the group consisting of copper oxide, vanadium oxide, and noble metals supported on any one of alumina, silica or zirconia, and wherein the residence time for the catalytic oxidation of hydrogen bromide is on the order of from 2 to 10 seconds.

13. A process as claimed in claim 1 wherein the weight ratio of hydrogen bromide to sulphuric acid in the aqueous solution used in said contacting is in excess of 1.653, and wherein the catalyst is selected from the group consisting of copper oxide, vanadium oxide, and noble metals supported on any one of alumina, silica or zirconia, and wherein the catalytic oxidation of hydrogen bromide takes place at a temperature of from 200° C. to 400° C., and wherein the residence time for the catalytic oxidation of hydrogen bromide is on the order of from 2 to 10 seconds.

14. A process as claimed in claim 1 wherein the catalytic oxidation of hydrogen bromide takes place at a temperature of from 200° C. to 400° C., and wherein the residence time for the catalytic oxidation of hydrogen bromide is on the order of from 2 to 10 seconds.

15. A process as claimed in claim 1 wherein the weight ratio of hydrogen bromide to sulphuric acid in the aqueous solution used in said contacting is in excess of 1.653, and wherein the catalytic oxidation of hydrogen bromide takes place at a temperature of from 200° C. to 400° C., and wherein the residence time for the catalytic oxidation of hydrogen bromide is on the order of from 2 to 10 seconds.

16. A process as claimed in claim 1 wherein the catalyst is selected from the group consisting of copper oxide, vanadium oxide and noble metals supported on any one of alumina, silica or zirconia, and wherein the catalytic oxidation of hydrogen bromide takes place at a temperature of from 200° C. to 400° C., and wherein the residence time for the catalytic oxidation of hydrogen bromide is on the order of from 2 to 10 seconds.

* * * * *